United States Patent
Marsh et al.

(10) Patent No.: US 6,783,657 B2
(45) Date of Patent: Aug. 31, 2004

(54) SYSTEMS AND METHODS FOR THE ELECTROLYTIC REMOVAL OF METALS FROM SUBSTRATES

(75) Inventors: Eugene P. Marsh, Boise, ID (US); Stefan Uhlenbrock, Boise, ID (US); Donald L. Westmoreland, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 34 days.

(21) Appl. No.: 10/231,434

(22) Filed: Aug. 29, 2002

(65) Prior Publication Data

US 2004/0040853 A1 Mar. 4, 2004

(51) Int. Cl.[7] .............................. B23H 11/00; B23H 3/00
(52) U.S. Cl. ....................... 205/640; 205/674; 205/675; 205/676; 205/677; 205/103; 205/107; 204/242
(58) Field of Search .................................. 205/640, 674, 205/675, 676, 677, 103, 107; 204/242

(56) References Cited

U.S. PATENT DOCUMENTS

| | | |
|---|---|---|
| 5,256,565 A | 10/1993 | Bernhardt et al. |
| 5,543,032 A | 8/1996 | Datta et al. |
| 5,614,076 A | 3/1997 | Brophy et al. |
| 5,893,966 A | 4/1999 | Akram et al. |
| 5,993,637 A * | 11/1999 | Hisamatsu et al. ......... 205/652 |
| 6,004,440 A | 12/1999 | Hanson et al. |
| 6,080,291 A | 6/2000 | Woodruff et al. |
| 6,083,376 A | 7/2000 | Akram et al. |
| 6,103,096 A | 8/2000 | Datta et al. |
| 6,234,870 B1 | 5/2001 | Uzoh et al. |
| 6,254,742 B1 | 7/2001 | Hanson et al. |
| 6,261,426 B1 | 7/2001 | Uzoh et al. |
| 6,277,262 B1 | 8/2001 | Akram et al. |
| 6,315,883 B1 | 11/2001 | Mayer et al. |
| 6,322,674 B1 | 11/2001 | Berner et al. |
| 6,322,684 B1 | 11/2001 | Hodko et al. |
| 2002/0130049 A1 * | 9/2002 | Chen et al. ................. 205/640 |
| 2003/0209448 A1 * | 11/2003 | Hu et al. .................... 205/640 |

OTHER PUBLICATIONS

Ginzburg et al., *Analytical Chemistry of Platinum Metals*, Jerusalem, Israel, 1975; title page, publication page, table of contents, 16–18. No month Avail.

Parker, ed., *McGraw–Hill Concise Encyclopedia of Science & Technology*, New York, New York, 1989; title page, publication page, 691. No month avail.

* cited by examiner

*Primary Examiner*—Wesley A. Nicolas
(74) *Attorney, Agent, or Firm*—Mueting, Raasch & Gebhardt, P.A.

(57) ABSTRACT

The present invention provides methods and systems for the electrolytic removal of platinum and/or other of the Group 8–11 metals from substrates.

40 Claims, 3 Drawing Sheets

SYSTEMS AND METHODS FOR THE ELECTROLYTIC REMOVAL OF METALS FROM SUBSTRATES

FIELD OF THE INVENTION

The present invention relates particularly to electrolytic removal (e.g., dissolution, etching, or polishing) methods for use in the formation of various structures on substrates, such as semiconductor substrates or substrate assemblies.

BACKGROUND OF THE INVENTION

Films of metals and metal oxides, particularly the heavier elements of Groups 8–11 (Fe, Co, Ni, and Cu groups), are becoming important for a variety of electronic applications. This is at least because many of the Group 8–11 metal films (e.g., Pd, Pt) are generally unreactive, resistant to oxidation or retard the diffusion of oxygen, and are good conductors. Oxides of certain of these metals also possess many of these properties, although perhaps to a different extent.

Thus, films of Group 8–11 metals, their alloys, and metal oxides, particularly the second and third row metals (e.g., Ru, Os, Rh, Ir, Pd, and Pt) have suitable properties for a variety of uses in integrated circuits. For example, they can be used in integrated circuits for barrier materials, for example. They are particularly suitable for use as barrier layers between the dielectric material and the silicon substrate in memory devices. Furthermore, they are suitable as the plate (i.e., electrode) itself in capacitors.

Platinum is one of the candidates for use as an electrode for high dielectric capacitors. Capacitors are the basic charge storage devices in random access memory devices, such as dynamic random access memory (DRAM) devices, static random access memory (SRAM) devices, and now ferroelectric memory (FE RAM) devices. They consist of two conductors, such as parallel metal or polysilicon plates, which act as the electrodes (i.e., the storage node electrode and the cell plate capacitor electrode), insulated from each other by a dielectric material (a ferroelectric dielectric material for FE RAMs). Thus, there is a continuing need for methods for the processing, e.g., removal, of Group 8–11 metal-containing films, preferably, platinum-containing films.

The planarization of a surface that includes platinum and other Group 8–11 metals typically involves mechanical polishing, as opposed to chemical-mechanical polishing, because they are relatively chemically inert and/or have relatively few water soluble products. Such mechanical polishing uses alumina, silica, or other abrasive particles to remove the metal physically. Unfortunately, mechanical polishing tends to smear (e.g., deform) the metals, leaving metal over undesired portions of the wafer surface, and leaving scratches in either the metal itself or other areas on the wafer surface. Also, many commercially available abrasive slurries do not effectively planarize platinum or other Group 8–11 metal-containing surfaces either because no material is removed or the resultant surface has defects therein.

Various etching processes are used in the fabrication of semiconductor devices to remove various materials. Such etching processes are used to control and maintain critical dimensions of various device structures such as, for example, transistors, capacitors, and interconnects. However, the removal of materials such as Group 8–11 metal-containing films by wet etching, for example, is generally very difficult. This is particularly true with respect to films containing rhodium, iridium, alloys thereof, and oxides thereof. For example, removal of metallic rhodium (Rh) and iridium (Ir) requires the use of high temperatures and/or high pressures with strong oxidizers and acids.

Thus, a need still exists for methods of removal of materials, particularly Group 8–11 metal-containing films, from semiconductor substrates or substrate assemblies.

SUMMARY OF THE INVENTION

The present invention provides methods that overcome many of the problems associated with the removal of platinum and/or other of the Group VIIIB metals (i.e., Groups 8, 9, and 10 of the Periodic Table of Elements) and Group IB metals (i.e., Group 11 of the Periodic Table of Elements) from substrates. Preferably, the methods of the present invention are effective for the removal of at least one of the second and/or third row metals of Group VIIIB (i.e., Groups 8, 9, and 10, which include Rh, Ru, Ir, Pd, Os, and Pt) and/or Group IB (i.e., Group 11, which includes Au and Ag) from a surface. More preferably, the methods of the present invention are effective for the removal of at least one of Co, Rh, Ru, Ir, Ni, Pd, Pt, Os, Au, and Ag from a surface. Most preferably, the methods of the present invention are effective for the removal of at least one of Rh, Ir, and Pt, or alloys thereof, from a surface. Such a surface is referred to herein as a "metal-containing surface."

That is, a "metal-containing surface" refers to an exposed region having a metal present, preferably at least one metal of the Periodic Table Groups 8–11 present. In such an exposed region, the metal is preferably present in an amount of at least about 10 atomic percent, more preferably at least about 20 atomic percent, and most preferably at least about 50 atomic percent, of the composition of the region, which may be provided as a layer, film, coating, etc., to be etched in accordance with the present invention. The surface preferably includes one or more Group 8–11 metals in elemental form or an alloy thereof (with each other and/or one or more other metals of the Periodic Table), as well as conductive oxides and silicides thereof. More preferably, the surface includes (and most preferably, consists essentially of) one or more Group 8–11 metals in elemental form or an alloy of such metals only.

In one embodiment of the invention, there is a method for electrochemically removing a metal from a substrate surface with an electrolyte. The method includes: providing an electrochemical cell that includes: a reservoir for containing an electrolyte; a first electrode that includes a substrate having a metal-containing surface positioned to interface with the electrolyte; and a counter electrode in electrical contact with the first electrode; and applying an alternating or bipolar pulsed electrical current to the electrochemical cell. In one embodiment of this method, the metal-containing surface includes a metal selected from the group consisting of a Group VIIIB metal (i.e., Groups 8, 9, and 10) and a combination thereof. In another embodiment of this method, the metal-containing surface includes a metal selected from the group consisting of a Group IB metal (i.e., Group 11) and a combination thereof.

In another embodiment of the invention, there is a method for electrochemically removing a metal from a substrate surface with an electrolyte, wherein the method includes: providing an electrochemical cell that includes: a reservoir for containing an electrolyte; a first electrode that includes a substrate having a metal-containing surface positioned to interface with the electrolyte; and a counter electrode in electrical contact with the first electrode; wherein the substrate is a semiconductor substrate or substrate assembly; and applying an alternating electrical current to the electrochemical cell. In one embodiment of this method, the metal-containing surface includes a metal selected from the group consisting of a Group VIIIB metal (i.e., Groups 8, 9, and 10) and a combination thereof (preferably, a Group VIIIB second row metal (Ru, Rd, Pd), a Group VIIIB third row metal (Os, Ir, Pt), or a combination thereof). In another embodiment of this method, the metal-containing surface includes a metal selected from the group consisting of a Group IB metal (i.e., Group 11) and a combination thereof (preferably, a Group IB second row metal (Ag), a Group IB third row metal (Au), or a combination thereof).

The present invention also provides an apparatus for electrochemically removing a metal from a substrate surface with an electrolyte.

In one embodiment, the apparatus includes: a reservoir for containing an electrolyte; a first electrode that includes a substrate having a metal-containing surface positioned to interface with the electrolyte; a counter electrode in electrical contact with the first electrode; and a power supply to deliver alternating or bipolar pulsed current between the first electrode and the counter electrode. In one embodiment of this apparatus, the metal-containing surface includes a metal selected from the group consisting of a Group 8–10 metal and a combination thereof. In another embodiment of this apparatus, the metal-containing surface includes a metal selected from the group consisting of a Group 11 metal and a combination thereof.

In another embodiment, the apparatus includes: an electrolyte composition; a first electrode that includes a substrate having a metal-containing surface positioned to interface with the electrolyte composition; a conductive polishing pad for electrical contact with the first electrode; an abrasive for polishing the metal-containing surface; a carrier assembly comprising a substrate holder to support the substrate; a drive assembly for use in rotating at least one of the substrate holder and conductive polishing pad; and a power supply to deliver alternating or bipolar pulsed current between the first electrode and the counter electrode. In one embodiment of this apparatus, the metal-containing surface includes a metal selected from the group consisting of a Group 8–10 metal and a combination thereof. In another embodiment of this apparatus, the metal-containing surface includes a metal selected from the group consisting of a Group 11 metal and a combination thereof.

As used herein, "semiconductor substrate or substrate assembly" refers to a semiconductor substrate such as a base semiconductor layer or a semiconductor substrate having one or more layers, structures, or regions formed thereon. A base semiconductor layer is typically the lowest layer of silicon material on a wafer or a silicon layer deposited on another material, such as silicon on sapphire. When reference is made to a substrate assembly, various process steps may have been previously used to form or define regions, junctions, various structures or features, and openings such as capacitor plates or barriers for capacitors.

DETAILED DESCRIPTION OF PREFERRED EMBODIMENTS

Figure 1:
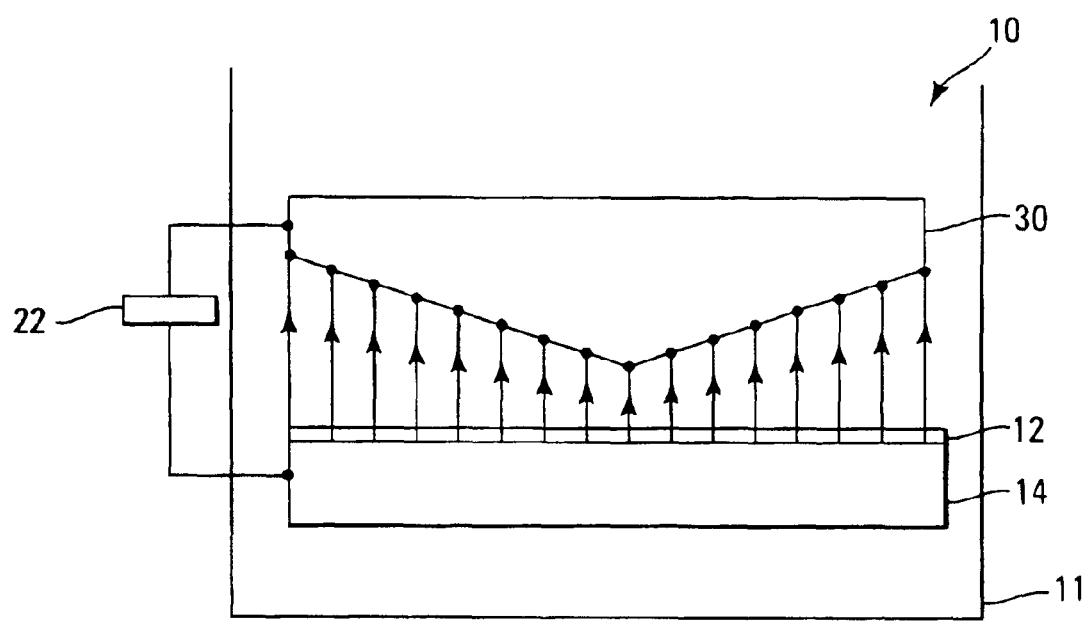
FIG. 1 is a schematic of an example of an electrolytic etching apparatus according to the present invention.

The present invention provides methods of removing a metal from a surface electrolytically, as by etching or dissolving, for example, particularly a surface that includes platinum and/or one or more of the other Group VIIIB and/or Group IB metals. The Group VIIIB metals are also referred to as the transition metals of Groups 8, 9, and 10 of the Periodic Table of Elements. The Group IB metals are also referred to as the transition metals of Group 11 of the Periodic Table of Elements. Preferably, the metals include Co, Rh, Ir, Ni, Pd, Pt, Ru, Os, Au, and Ag. Particularly preferred surfaces that can be electrolytically processed according to methods of the present invention include Rh, Ru, Ir, Pd, Pt, Os, Au, and/or Ag. Even more preferred surfaces that can be electrolytically processed according to methods of the present invention include Rh, Ir, and/or Pt. Such a surface is referred to herein as a metal-containing surface (this preferably refers to those containing second and/or third row transition metals).

Herein, a "metal-containing surface" includes an exposed region having a metal present. In such an exposed region, the metal is preferably present in an amount of at least about 10 atomic percent, more preferably at least about 20 atomic percent, and most preferably at least about 50 atomic percent, of the composition of the region, which may be provided as a layer, film, coating, etc., to be processed in accordance with the present invention. In addition, the metal-containing surface can further include one or more of a conductive oxide, silicide, or combination thereof.

The process of the present invention includes electrolytically removing a metal. This typically includes electrochemical dissolution and is often referred to generically as electroetching or electrolytic etching.

Electrolytic etching, i.e., electroetching, is one of a number of methods commonly used to remove metals from the surface of a metallic workpiece (i.e., a substrate) to provide the workpiece with an etched surface layer. Typically, in the electroetching method, the surface to be etched forms the anode of an electrolytic cell and a counter electrode (i.e., the cathode) is appropriately positioned to complete the cell. A suitable electrolyte is then directed onto the metal surface (i.e., the anode) while an electric current is applied to the system, leading to an accelerated etching of the metallic surface.

Typically, when electroetching noble metals a direct current process seems to self passivate, and stops etching after a short period of time, often as short as several seconds. However, if an alternating current is applied, then the etch process can continue until the metal layer is consumed. In addition, a bipolar pulsed current could be used in place of an alternating current.

In the microelectronics industry, electroetching is commonly used for through-mask patterning and for the removal of a continuous thin film of conducting metal (such as seed layers) from the surface of a semiconductor wafer. Different types of electroetching apparatus are known, and the literature describes a variety of electrolyte flow systems for use with such apparatus ranging from non-agitated to impinging electrolyte jets. For example, electroetching systems are known that progressively treat only a small portion of the wafer to be etched using a multi-nozzle cathode assembly that has a small width relative to the overall dimensions of the wafer (surface) to be etched.

A preferred process of the present invention involves electropolishing. This is a type of planarization, and is often considered an alternative to chemical mechanical polishing (CMP). Electropolishing is a method of polishing metal surfaces by applying an electric current through an electrolytic bath using, for example, a conductive pad.

Any of a wide variety of systems can be used for the methods of the present invention. The following description provides a general description of the electropolishing process. It is appreciated that changes to any number of apparatus components and/or operating conditions can be made without departing from the overall electropolishing process.

FIG. 1 shows an apparatus 10 for electrochemically etching a surface 12 of a substrate, such as the wafer 14. The apparatus 10 generally includes a reservoir 11, which is preferably made of a plastic material to resist the corrosive effects of the electrolyte used in the process. The reservoir 11 is typically adapted with a holder (not shown) for receiving the wafer 14 from which material is to be electrolytically removed, e.g., etched. The wafer 14 is preferably positioned within the holder so that the wafer 14 is placed with the metallized side (the surface 12) exposed to the electrolyte and held in place such that there it is electrically connected to form a first electrode of an electrochemical etching circuit. The etching circuit further includes a power supply 22.

The counter electrode 30 preferably has a surface that includes a configuration and a shape designed to generate substantially uniform removal (i.e., the constant removal or material across a substrate surface (e.g., wafer surface) within 1%) of metal from the surface 12. In one preferred embodiment, essentially the entire surface of the counter electrode 30 is configured to define the shape of the electrode 30. In other words, the surface of the electrode 30 is configured into a single shape. Preferably, the surface of the counter electrode 30 defines either a conical, a partial conical, or a convex (dome-shaped) shape.

In addition, other surface shapes that provide for uniform removal of metal from the surface are also possible. For example, in an additionally preferred embodiment, the counter electrode 30 can include two or more examples of a shape designed to generate uniform removal. Preferably, the two or more examples of the shape can be uniformly spaced across the counter electrode 30. In an additionally preferred embodiment, the two or more examples of the shape can be concentrically arranged ridges. Preferably, the ridges can be continuous (e.g., like a record groove) or non-continuous (e.g., individual rings). Preferably, the ridges can also have a cross-sectional shape that includes triangular, semi-circular, and semi-parabolic. Other cross-sectional shapes are also possible. Such electrodes are described in Applicants' Assignees' U.S. application Ser. No. 10/232,215, filed Aug. 29, 2002, entitled SYSTEMS FOR ELECTROLYTIC REMOVAL OF METALS FROM SUBSTRATES.

Although the shape shown in FIG. 1 for the counter electrode is particularly desirable, it is not required. For example, the counter electrode can be in any shape or size as long as it is made of a material, such as stainless steel, that completes the electrochemical circuit and facilitates removal of material from the first electrode. Other materials of which the counter electrode can be made include, for example, Pt, Ni and/or Au. In addition, it is possible to have two or more counter electrodes.

A suitable electrolyte can be delivered and caused to impinge upon the surface 12 of the wafer 14 by any of a variety of mechanisms. Such mechanisms are well known in the art. For example, impinging electrolyte jets could be used to direct the electrolyte to the surface 12. Alternatively, an electrolyte bath can be used to expose the surface 12 to the electrolyte. Examples of mechanisms for delivering electrolyte are illustrated in U.S. Pat. Nos. 6,234,870 to Uzoh et al.; 6,103,096 to Datta et al.; 6,083,376 to Akiram et al.; 5,614,076 to Brophy et al.; and 5,256,565 to Bernhardt et al.

The electrolyte is preferably an aqueous solution that includes one or more components that makes the solution electrically conductive. Also, the metal being removed should form a soluble salt in the electrolyte. Preferably, the electrolyte also chemically enhances removal of the desired material relative to the material that is not to be removed. Examples of suitable electrolytes include aqueous solutions of hydrochloric acid, ammonium hydroxide, acetic acid, and/or other dilute mineral acids such as sulfuric acid, and/or phosphoric acid. A preferred electrolyte is hydrochloric acid.

The concentration of the electrolyte is preferably sufficient to provide electrical conductivity, and preferably, enhance removal of the desired material. Preferably, the electrolyte concentration is within a range of about 0.01 moles per liter of solution (Molar) to about 12 Molar. More preferably, the electrolyte concentration is within a range of about 0.1 to about 3.0 Molar. In addition, it is also possible to add one or more salts at a concentration sufficient to enhance the conductivity of the electrolyte solution.

The spacing, or interelectrode gap, between the workpiece (i.e., the wafer 14), which serves as one electrode, and the counter electrode 30, is preferably kept small to maintain effective electrolyte impingement and to allow the cell voltage to be kept as low as possible. For example, an interelectrode gap of about 0.1 millimeter (mm) to about 5 mm is preferred because a larger gap will tend to require a higher cell voltage while a lower gap will tend to yield stronger edge effects.

The wafer 14 and/or the counter electrode 30 can be attached to a shaft and motor (not shown) for providing rotational motion. This embodiment draws upon the concept of rotating disc electrodes and can be designed according to well known techniques.

Typically, a mask layer is patterned over the layer of material to be removed by the electrolytic process of the present invention. The masking is accomplished with a material of relatively low ionic conductivity and diffusivity, which effectively slows or blocks transport of the metal ions produced during electrolytic removal.

The apparatus 10 can also be modified to include rinsing and drying functions. Alternatively, the etching, rinsing, and drying functions can also be performed using three separate stations. An appropriate mechanism, such as a robot, for example, can carry the substrate, such as the wafer 14, among three separate stations. The substrate is etched at a first station, rinsed at a second station, and dried at a third station.

The counter electrode 30 and wafer 14 are electrically connected to a voltage source or power supply 22. The current and voltage of the electrolytic system will depend on the cell design and the desired rate of removal. Generally, direct currents only work if no more than a few angstroms of material are to be removed. Typical currents are within a range of about 0.001 to about 40 Amperes. Typical voltages are within a range of about 1 to about 100 volts. Generally, the higher the current, the higher the rate of material removal. Preferably, a method in accordance with the present invention is conducted at atmospheric pressure and at a temperature of about 1° C. to about 100° C., and more preferably at a temperature of about 10° C. to about 60° C.

Removal of material in such an electrolytic system may introduce a certain degree of roughness to the surface 12 of the wafer 14 due to the inability of the process to provide micro-smooth surfaces. Thus, the electrolytic etching process can be followed by a chemical mechanical polishing (CMP) process to remove the surface roughness. CMP may also aid in the removal of thin electrically isolated areas from the surface 12 of the wafer 14. Herein, "chemical mechanical polishing" and "CMP" refer to a dual mechanism having both a chemical component and a mechanical component, wherein corrosion chemistry and fracture mechanics both play a roll in the removal of material, as in wafer polishing.

Preferably, however, the electrolytic etching process is supplemented with mechanical polishing, thereby resulting in an electroplanarization or electropolishing process. This involves the use of a conductive polishing pad and/or conductive zones in the polishing pad. A polishing pad made of a conductive polymer can be used. Examples of conductive polymers are known.

Alternatively, conventional polishing pads can be modified, for example, to include one or more conductive segments or elements (e.g., stainless steel, or other metal) within, or recessed, the pad. In one example, the one or more conductive elements have a similar shape.

Conventional polishing pads are typically made from a material such as polyurethane, polyester, acrylic, acrylic ester copolymers, polytetrafluoroethylene, polypropylene, polyethylene, cellulose, cellulose esters, polamides, polyimides, polysiloxane, polycarbonates, epoxides, phenolic resins, etc. They include, for example, a polyurethane-based foam material, wherein the foam cell walls of the pad aid in removal of reaction products at the wafer surface and the pores within the pad assist in supplying electrolyte to the pad/wafer interface. They can include convex or concave features, which can be formed by embossing a surface pattern. For example, a polishing pad can have continuous grooves in concentric ellipses in the surface of the pad for more uniform electrolyte delivery and more effective debris removal.

Typically, the polishing pads are disk-shaped and rotatable about a fixed plane and axis at constant or variable speeds. Typically, the speed of rotation ranges from about 2 revolutions per minute (rpm) to about 200 rpm.

Figure 2:
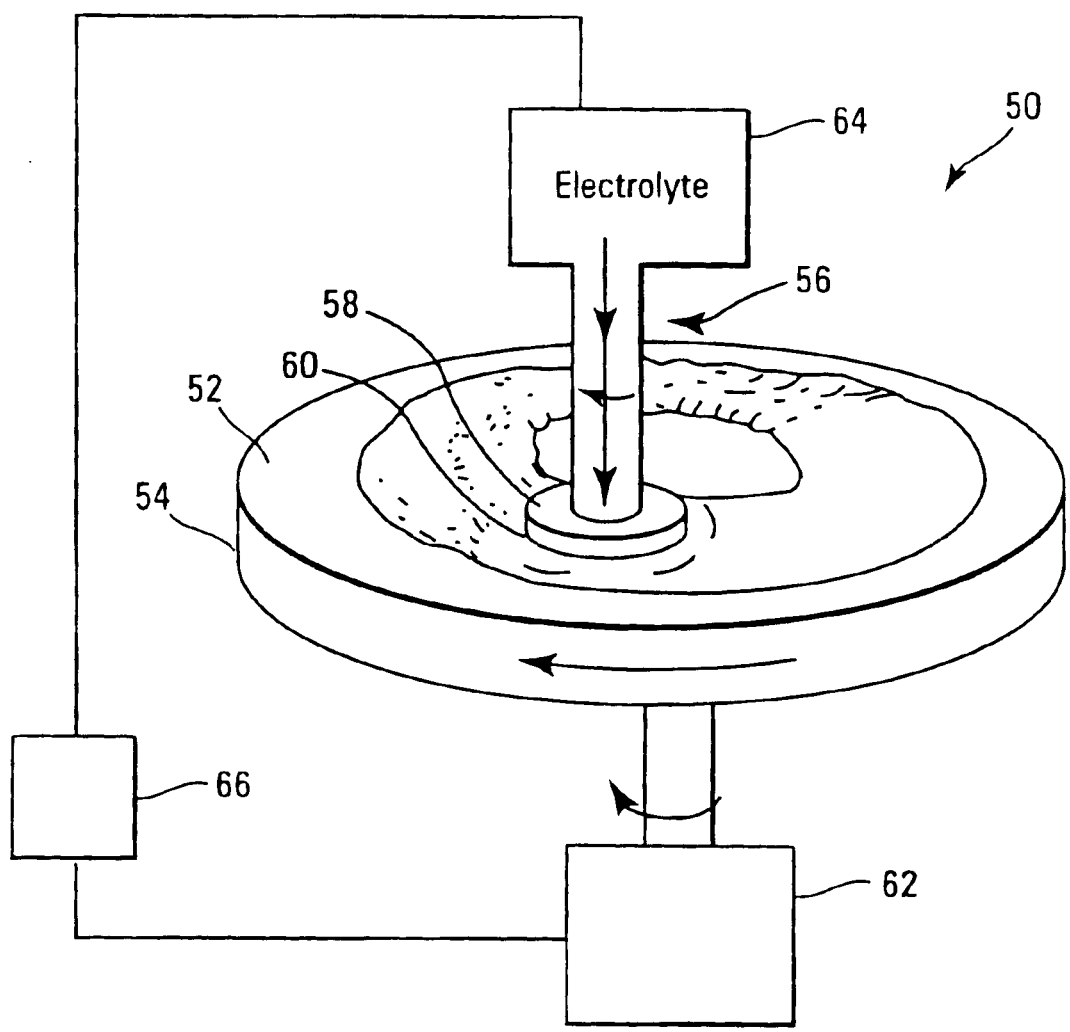
FIG. 2 is a schematic of an example of an electropolishing apparatus.

In a preferred electropolishing apparatus 50, as shown in FIG. 2, a polishing pad 52 is fixed on a platen or table 54. The polishing pad 52 is held in place on the platen or table 54 such that there it is electrically connected to form the counter electrode.

A carrier assembly 56 that includes a substrate holder 58 to support the substrate 60 (e.g., wafer) typically using suction, and a first drive assembly 62 to rotate and/or reciprocate the platen and/or a second drive assembly 64 to rotate and/or translate the substrate holder 58 during planarization. Thus, conventional planarizing machines rotate the carrier assembly 56, the polishing pad 52, or both the carrier assembly 56 and the polishing pad 52.

The substrate 60 (e.g., wafer) is preferably positioned on the substrate holder 58 so that the substrate 60 is placed with the metallized side exposed to the polishing pad 52 and the electrolyte and held in place such that there it is electrically connected to form a first electrode of an electrochemical etching circuit. The etching circuit further includes a power supply 66.

Typically, the polishing pad 52 is presoaked and continually rewet with the electrolyte. If the polishing pad 52 does not include abrasive particles embedded therein, the electrolyte includes abrasive particles, which is then referred to as an electrolytic abrasive slurry. The electrolyte or electrolytic abrasive slurry may be applied to the interface between the polishing pad 52 and a substrate surface 60 using a variety of techniques. For example, the component parts of the electrolyte or electrolytic abrasive slurry may be applied separately and mixed at the interface or immediately before contacting the interface. The electrolyte or electrolytic abrasive slurry can be applied by pumping it through the pad. Alternatively, it can be applied at the leading edge of the pad, although this may not provide uniform distribution of the electrolyte or electrolytic abrasive slurry across the surface 60 being planarized, which is desirable.

Figure 3A:
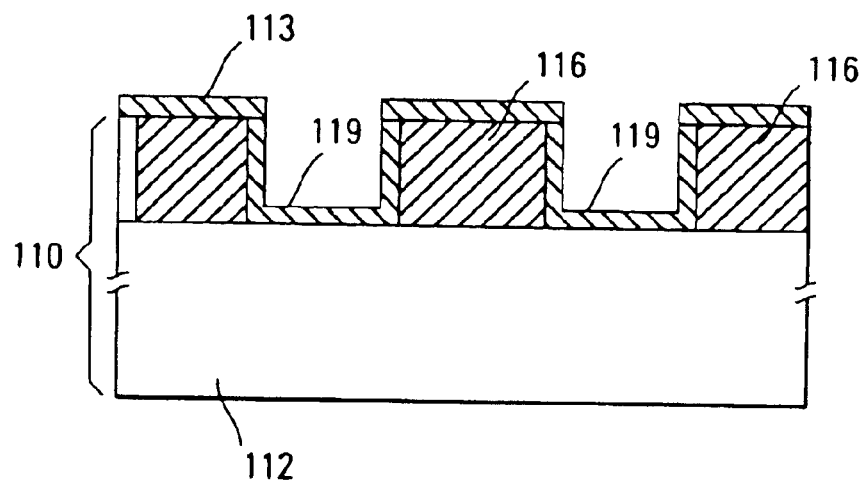
FIGS. 3A and 3B are cross-sectional illustrations of one portion of a wafer before and after a preferred electrolytic processing has been performed in accordance with the present invention.

The figures provide further information about the methods of the invention. FIG. 3A illustrates one portion of a wafer 100 prior to processing in accordance with the present invention. The wafer portion 100 includes a substrate assembly 112 having a patterned dielectric layer 116 formed thereon. Such a patterned dielectric layer 116 can be used in a variety of structures, particularly a capacitor structure. The patterned dielectric layer 116 can be formed of any material that provides electrical isolation between metal regions (e.g., silicon dioxide, silicon nitride, or BPSG).

An electrode layer 119 is then formed over the substrate assembly 112 and the patterned dielectric layer 116. The electrode layer 19 may be platinum or any other suitable conductive Group 8–11 metal-containing material. Alternatively, the electrode layer 19 may be a second or third row Group 8–11 metal-containing material.

Figure 3B:
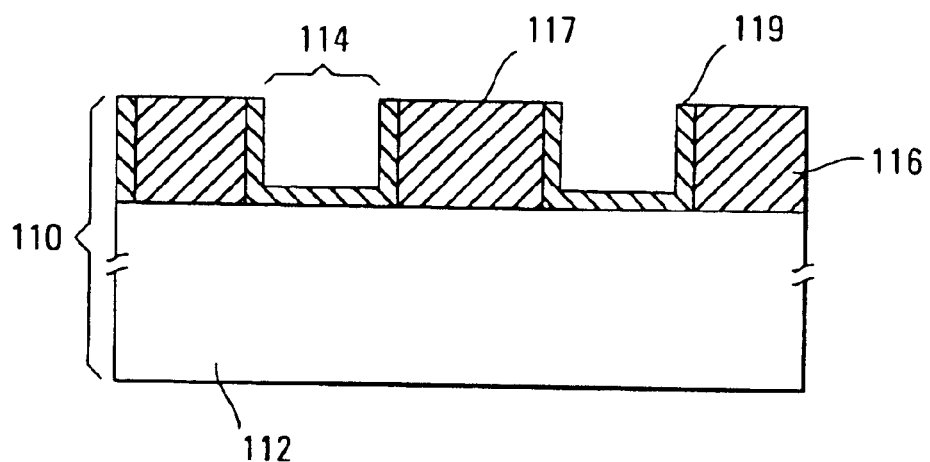

Generally, as shown in FIG. 3A, the nonplanar upper surface 113 of electrode layer 119 is subjected to processing in accordance with the present invention. The resulting wafer 100, as shown in FIG. 3B, includes an upper surface 117 electrolytically processed according to the present invention such that the thickness of the wafer 100 is substantially uniform across the entire wafer 100 so that the wafer now includes electrically conducting regions 114 isolated within the patterned dielectric material 16 forming a capacitor structure.

FIG. 3A is shown only to illustrate a surface having nonuniformities, such as height differences, in the fabrication of semiconductor devices. The present invention is not limited to use with nonplanar surfaces. The present invention is also beneficial for use with substantially planar surfaces. For example, the methods in accordance with the present invention is beneficial during the entire process, even at the end of the process when the surface being electrolytically processed is in a substantially planar state.

The following example is offered to further illustrate the various specific and preferred embodiments and techniques. It should be understood, however, that many variations and modifications may be made while remaining within the scope of the present invention.

EXAMPLE

A test sample was cut from a wafer containing a blanket layer of 1000 Å of sputtered platinum metal. Several locations on the sample were measured for sheet resistance before any polishing, directly correlating the metal thickness to the sheet resistance. An electrolytic cell was prepared by immersing a wafer sample in 1 M HCl using the wafer sample as the first electrode and a stainless steel rod as the counter electrode. Electrolytic processing was carried out using a variable AC source at between about 10 to 60 V.

After 0.1 minute the sample was rinsed and dried. The Pt film was completely removed, and a sheet resistance of essentially infinity was measured. The higher sheet resistance values yielded a calculated estimate of 1000 Å of film removed (or a removal rate of approximately 10,000 Å per minute).

The foregoing detailed description and example have been given for clarity of understanding only. No unnecessary limitations are to be understood therefrom. The invention is not limited to the exact details shown and described, for variations obvious to one skilled in the art will be included within the invention defined by the claims. For example, while the description above focused on planarization of semiconductor-based substrates, the compositions and methods of the invention are also applicable to, for example, polishing metallic mirrors, as one of many other possible applications. The complete disclosures of all patents, patent documents, and publications listed herein are incorporated by reference, as if each were individually incorporated by reference.

What is claimed:

1. A method for electrochemically removing a metal from a substrate surface with an electrolyte, the method comprising:
   providing an electrochemical cell comprising:
      a reservoir for containing an electrolyte;
      a first electrode comprising a substrate having a metal-containing surface positioned to interface with the electrolyte; and
      a counter electrode in electrical contact with the first electrode;
      wherein the metal-containing surface comprises a metal selected from the group consisting of a Group 8–11 metal and a combination thereof; and
   applying an alternating or bipolar pulsed electrical current to the electrochemical cell.

2. The method of claim 1 wherein the substrate is a semiconductor substrate or substrate assembly.

3. The method of claim 2 wherein the substrate is a silicon wafer.

4. The method of claim 1 wherein the counter electrode is made of a material comprising stainless steel.

5. The method of claim 1 wherein the metal-containing surface of the substrate comprises a metal selected from the group consisting of a Group 8–11 metal, and a combination thereof, which is in elemental form or an alloy thereof.

6. The method of claim 1 wherein the metal-containing surface of the substrate comprises a metal selected from the group consisting of a Group 8–11 second row metal, a Group 8–11 third row metal, and a combination thereof.

7. The method of claim 1 wherein the metal-containing surface of the substrate comprises a metal selected from the group consisting of Co, Rh, Ir, Ni, Pd, Pt, Ru, Os, Au, and Ag.

8. The method of claim 7 wherein the metal-containing surface comprises elemental platinum.

9. The method of claim 1 wherein the metal is present in an amount of about 50 atomic percent or more.

10. The method of claim 1 wherein the metal-containing surface comprises a conductive oxide, silicide, or combination thereof.

11. The method of claim 1 wherein the metal-containing surface comprises a metal selected from the group consisting of a Group 8–10 metal and a combination thereof.

12. The method of claim 1 wherein the metal-containing surface comprises a metal selected from the group consisting of a Group 11 metal and a combination thereof.

13. A method for electrochemically removing a metal from a substrate surface with an electrolyte, the method comprising:
   providing an electrochemical cell comprising:
      a reservoir for containing an electrolyte;
      a first electrode comprising a substrate having a metal-containing surface positioned to interface with the electrolyte; and
      a counter electrode in electrical contact with the first electrode;
      wherein the substrate is a semiconductor substrate or substrate assembly;
      wherein the metal-containing surface comprises a metal selected from the group consisting of a Group 8–11 metal and a combination thereof; and
   applying an alternating electrical current to the electrochemical cell.

14. The method of claim 13 wherein the metal-containing surface comprises a metal selected from the group consisting of a Group 8–10 metal and a combination thereof.

15. The method of claim 13 wherein the metal-containing surface comprises a metal selected from the group consisting of a Group 11 metal and a combination thereof.

16. A method for electrochemically removing a metal from a substrate surface with an electrolyte, the method comprising:
   providing an electrochemical cell comprising:
      a reservoir for containing an electrolyte;
      a first electrode comprising a substrate having a metal-containing surface positioned to interface with the electrolyte; and
      a counter electrode in electrical contact with the first electrode;
      wherein the substrate is a semiconductor substrate or substrate assembly;
      wherein the metal-containing surface comprises a metal selected from the group consisting of a Group 8–11 second row metal, a Group 8–11 third row metal, and a combination thereof; and
   applying an alternating or bipolar pulsed electrical current to the electrochemical cell.

17. The method of claim 16 wherein the metal is in elemental form or an alloy thereof.

18. The method of claim 16 wherein the metal-containing surface comprises elemental platinum.

19. The method of claim 16 wherein the metal is present in an amount of about 50 atomic percent or more.

20. The method of claim 16 wherein the metal-containing surface comprises a conductive oxide, silicide, or combination thereof.

21. The method of claim 16 wherein the metal-containing surface comprises a metal selected from the group consisting of a Group 8–10 metal and a combination thereof.

22. The method of claim 16 wherein the metal-containing surface comprises a metal selected from the group consisting of a Group 11 metal and a combination thereof.

23. A method for electrochemically removing a metal from a substrate surface with an electrolyte, the method comprising:
   providing an electrochemical cell comprising:
      a reservoir for containing an electrolyte;
      a first electrode comprising a substrate having a metal-containing surface positioned to interface with the electrolyte; and
      a counter electrode in electrical contact with the first electrode;
      wherein the metal-containing surface comprises a metal selected from the group consisting of a Group 8–10 second row metal, a Group 8–10 third row metal, and a combination thereof; and applying an alternating electrical current to the electrochemical cell.

24. An apparatus for electrochemically removing a metal from a substrate surface with an electrolyte, comprising:

a reservoir for containing an electrolyte;

a first electrode comprising a substrate having a metal-containing surface positioned to interface with the electrolyte;

a counter electrode in electrical contact with the first electrode; and a power supply to deliver alternating or bipolar pulsed electrical current between the first electrode and the counter electrode;

wherein the metal-containing surface comprises a metal selected from the group consisting of a Group 8–11 metal and a combination thereof.

25. The apparatus of claim 24 wherein the substrate is a semiconductor substrate or substrate assembly.

26. The apparatus of claim 25 wherein the substrate is a silicon wafer.

27. The apparatus of claim 24 wherein the counter electrode is made of a material comprising stainless steel.

28. The apparatus of claim 24 wherein the electrolyte comprises an aqueous solution selected from the group consisting of hydrochloric acid, ammonium hydroxide, acetic acid, sulfuric acid, and phosphoric acid.

29. The apparatus of claim 24 wherein the electrolyte has a concentration within a range of about 0.01 Molar to about 12 Molar.

30. The apparatus of claim 24 wherein the power supply delivers alternating current with a voltage in a range of about 1 to about 100 volts.

31. The apparatus of claim 24 wherein the power supply delivers alternating current with a current in a range of about 0.001 to about 40 Amperes.

32. An apparatus for electropolishing of a metal from a substrate surface, comprising:

an electrolyte composition;

a first electrode comprising a substrate having a metal-containing surface positioned to interface with the electrolyte composition;

a conductive polishing pad for electrical contact with the first electrode;

an abrasive for polishing the metal-containing surface;

a carrier assembly comprising a substrate holder to support the substrate;

a drive assembly for use in rotating at least one of the substrate holder and conductive polishing pad; and a power supply to deliver alternating or bipolar pulsed electrical current between the first electrode and the counter electrode, wherein the metal-containing surface comprises a metal selected from the group consisting of a Group 8–11 metal and a combination thereof.

33. The apparatus of claim 32 wherein the substrate is a semiconductor substrate or substrate assembly.

34. The apparatus of claim 32 wherein the conductive polishing pad has one or more conductive elements.

35. The apparatus of claim 32 wherein the metal-containing surface is exposed to the conductive polishing pad.

36. The apparatus of claim 32 wherein the electrolyte comprises an aqueous solution selected from the group consisting of hydrochloric acid, ammonium hydroxide, acetic acid, sulfuric acid, and phosphoric acid.

37. The apparatus of claim 32 wherein the electrolyte has a concentration within a range of about 0.01 Molar to about 12 Molar.

38. The apparatus of claim 32 wherein the power supply delivers alternating current with a voltage in a range of about 1 to about 100 volts.

39. The apparatus of claim 32 wherein the power supply delivers alternating current with a current in a range of about 0.001 to about 40 Amperes.

40. An apparatus for electrochemically removing a metal from a substrate surface with an electrolyte, comprising:

a reservoir for containing an electrolyte;

a first electrode comprising a substrate having a metal-containing surface positioned to interface with the electrolyte;

a counter electrode in electrical contact with the first electrode; and a power supply to deliver alternating electrical current between the first electrode and the counter electrode;

wherein the metal-containing surface comprises a metal selected from the group consisting of a Group 8–11 second row metal, a Group 8–11 third row metal, and a combination thereof.

* * * * *